R. GIBBS.
Tire-Upsetting-Machines.
No. 142,455. Patented September 2, 1873.
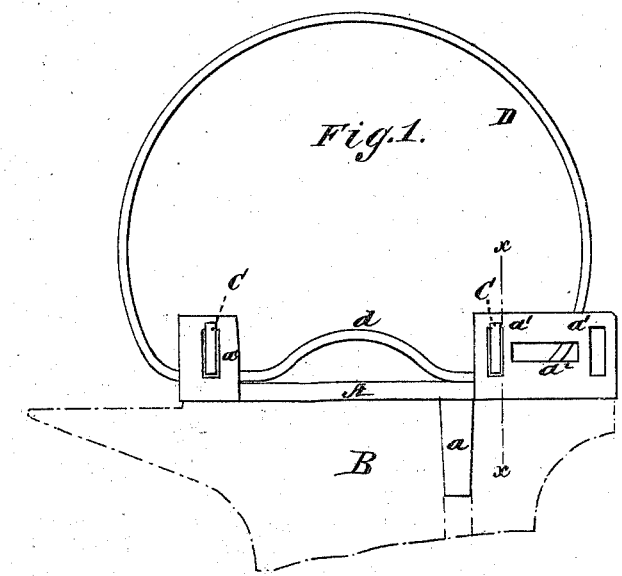
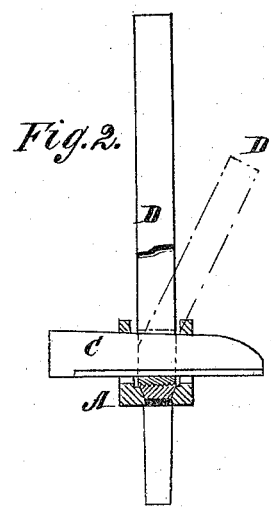
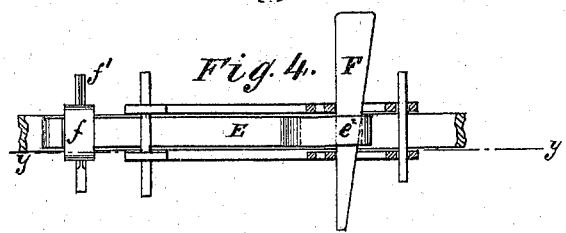
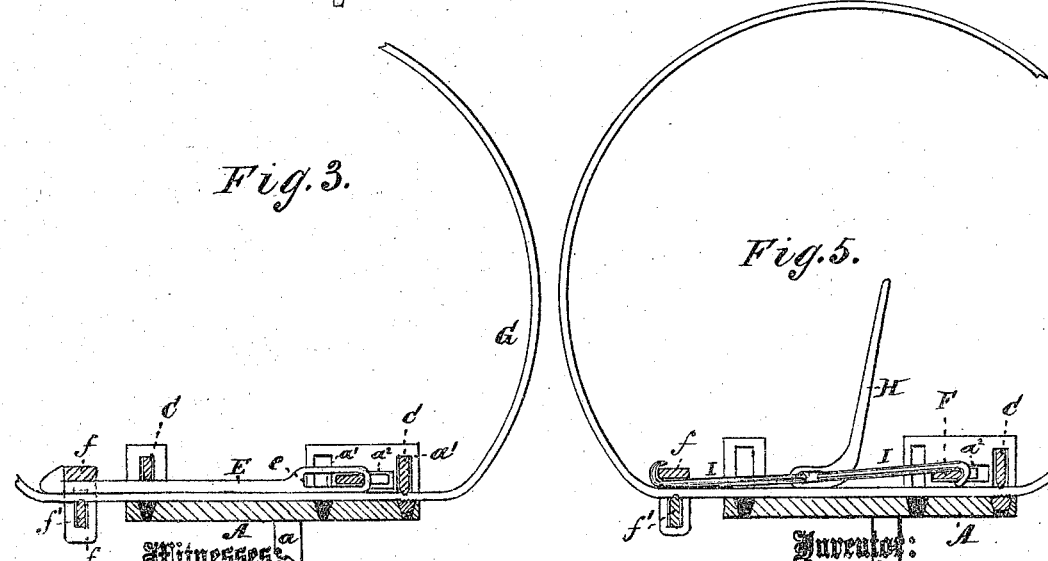
Witnesses:
G. Matthys
John E. Kemon
Inventor:
Robert Gibbs
Per ———
Attorneys.

UNITED STATES PATENT OFFICE.

ROBERT GIBBS, OF SPRING HILL, MISSOURI, ASSIGNOR TO HIMSELF AND SARAH E. GIBBS, OF SAME PLACE.

IMPROVEMENT IN TIRE-UPSETTING MACHINES.

Specification forming part of Letters Patent No. 142,455, dated September 2, 1873; application filed April 21, 1873.

*To all whom it may concern:*

Be it known that I, ROBERT GIBBS, of Spring Hill, in the county of Livingston and State of Missouri, have invented a new and useful Improvement in Tire-Shrinkers; and I do hereby declare the following to be a full, clear, and exact description of the same, reference being had to the accompanying drawing forming part of this specification.

The invention consists in improved means for shrinking tires or bands, as hereinafter described and subsequently pointed out in the claim.

Figure 1 is a side elevation of my invention. Fig. 2 is a transverse section of same in line $x\,x$, Fig. 1; and Figs. 3, 4, and 5 are sections of modifications.

In the drawing, A represents the base, from which is pendent the bar $a$, that enters the hole of an anvil, B. This base has two parallel flanges on each end, which have each key-slots $a^1$—one or more. C C are clamp-keys, which pass through the slots $a^1\,a^1$, and D a tire in which an arch, $d$, is formed, the dimensions of the arch being correspondent to the shortening which is required. After the keys C C are passed through slots $a^1$ and made to hold the arched tire D $d$ firmly to the base A this arch is hammered until it is contracted and made to coincide with the surface of base. This gives the shortening required. Again, the base A has also a horizontal slot, $a^2$, which is made to register with the long horizontal slot $e^2$ of a slide-bar gage, E, while both are thus adapted to receive a gage-key, F. The bar E has a loop, $e^2$, of the oblong slotted form, in which works the gage-key F, that is made tapering to draw said bar when driven or forced by a lever in either direction.

The gage-bar and key, one or both, may be provided with a scale made longitudinally thereon. A tire, G, is fastened to the base A with the keys C C, and under and to the gage bar E by a clamp and key, $f\,f'$, when the gage-key is driven through the slots $a^2\,e^2$ and thus enabled to cause the bar to move. This staves up the metal in that part of tire that is under the gage-bar, while the degree of shortening is clearly shown either by the scale of bar or gage-key as the operation progresses. Again, the same effect may be produced by an end-slotted lever, H, and hooks I I, applied, respectively, over and under the gage-key and clamp-key $f\,f'$.

The lever H, provided with hooks I I, is to be used in place of the slide-bar gage E. I place the hooks I I one on the point of the gage-key F and the other over or under tire-clamp. Then fasten the tire with key C rigidly to the base at one end and slightly at the opposite end, in order to let the tire and hooks pass under when shrinking, while it is prevented, at the same time, from rising.

Finally, I operate the lever, and find it able to shorten the tire. If one operation with lever is not sufficient, return the lever H to an upright position, slide the gage-key F farther, and repeat the contraction.

Thus I show three distinct modes of shortening tire and one of bands on the same base, namely, by the arch and hammer, by the slide-bar gage and gage-key F, and by the hand-lever H.

Having thus described my invention, what I claim as new, and desire to secure by Letters Patent, is—

The base A, having flanges with slots $a\,a^2$, the key C F, key-clamps $f\,f'$, and the slide-bar gage E $e\,e^2$, combined and constructed substantially as and for the purpose set forth.

ROBERT GIBBS.

Witnesses:
JAS. F. MOSS,
J. B. KIRK.